United States Patent
Jetten et al.

(10) Patent No.: US 6,716,976 B1
(45) Date of Patent: Apr. 6, 2004

(54) PROCESS FOR SELECTIVE OXIDATION OF CELLULOSE

(75) Inventors: Jan Matthijs Jetten, Zeist (NL); Ronald Van Den Dool, Culemborg (NL); Wim Van Hartingsveldt, Amersfoort (NL); Arie Cornelis Besemer, Amerongen (NL)

(73) Assignee: SCA Hygiene Products Zeist B.V., Zeist (NL)

( * ) Notice: Subject to any disclaimer, the term of this patent is extended or adjusted under 35 U.S.C. 154(b) by 0 days.

(21) Appl. No.: 09/913,596

(22) PCT Filed: Feb. 24, 2000

(86) PCT No.: PCT/NL00/00119
§ 371 (c)(1),
(2), (4) Date: Nov. 21, 2001

(87) PCT Pub. No.: WO00/50463
PCT Pub. Date: Aug. 31, 2000

(30) Foreign Application Priority Data

Feb. 24, 1999 (EP) .............................................. 99200537

(51) Int. Cl.⁷ .......................... C08B 15/00; C08B 15/04; C08B 11/04; C08B 11/08; C08B 11/12
(52) U.S. Cl. .......................... 536/124; 536/18; 536/56; 435/101; 435/28
(58) Field of Search ........................... 536/18, 56, 124; 435/101, 28

(56) References Cited

U.S. PATENT DOCUMENTS

| 3,632,802 A | 1/1972 | BeMiller et al. | |
| 4,983,748 A | 1/1991 | Tsai et al. | |
| 5,747,658 A | 5/1998 | Veelaert et al. | |
| 5,831,043 A | * 11/1998 | Fleche | 536/18.5 |
| 6,087,135 A | * 7/2000 | Kierulff | 435/101 |

FOREIGN PATENT DOCUMENTS

| EP | 0 124 439 | 4/1984 | |
| RU | 592905 | * 2/1978 | D21H/3/02 |
| WO | 95/07303 | 3/1995 | |
| WO | 99/23117 | 5/1999 | |

OTHER PUBLICATIONS

Chang, P. S. et al "Oxidation of primary alcohol groups of naturally occuring polysaccharides with 2,2,6,6–tetramethyl–1–piperidine oxoammonium ion" J. Carbohydrate Chemistry, 1996, 15(7), pp 819–830.*

Fieser, L. F. and Fieser, M., "Acetals and Ketals", *Organic Chemistry*, 3d Ed., [Reinhold Publishing Corp., NY] 215, 1956.

Luner, P., et al., "The Effect of Chemical Modification on The Mechanical Properties of Paper, 1. Oxidation and Reduction of Rayon Fibers", *Tappi*, 50(1): 37–39, 1967.

Roberts, J. D., and Caserio, M. C., "Typical Carbonyl Addition Reactions", *Organic Chemistry*, [W. A. Benjamin, Inc., New York, Amsterdam] Chpt. 14(3 & 4): 442–452 1965.

Young, R. A., "Bonding of Oxidized Cellulose Fibers and Interaction with Wet Strength Agents", *Wood & Fiber*, [The Society of Wood Science & Technology] 10(2): 112–119, 1978.

Bobbitt, J. M. and Flores, C. L., "Organic Nitrosonium Salts as Oxidants in Organic Chemistry", *Heterocycles*, 27(2), 509–533, XP 000609709, 1988.

de Nooy, A. E. J., et al., "Highly Selective Tempo Mediated Oxidation of Primary Alcohols Groups in Polysaccharides", *Recueil des Travaux Chimiques des Pays–Bas*, 113: 165–166, 1994.

Semmelhack, M. F., et al., "Oxidation of Alcohols to Aldehydes with Oxygen and Cupric Ion, mediated by Nitrosonium Iron", *J. Am. Chem. Soc.*, 106: 3374–3376, 1984.

A.E.J. De Nooy et al., "On the Use of Stable Organic Nitroxyl Radicals for the Oxidation of Primary and Secondary Alcohols", *Synthesis*, 1996, pp. 1153–1174.

Derek Horton et al., "Preparation of Unsubstituted 6–Aldehydocelluloses by Photolysis of 6–Azido–6–Deoxycelluloses", *Carbohydrate Research*, 26 (1973) 1–19.

Nelly Blumenkrantz et al., "New Method for Quantitative Determination of Uronic Acids", *Anal. Biochem*, 54 (1973) 484.

T.P. Nevell and S.H. Zeronian, *Cellulose Chemistry and Its Applications*, 1985, Ellis Horwood Ltd., Chichester, Great Britain, XP002136586, p. 256.

Chemical Abstracts, vol. 82, No. 20, Nov. 17, 1975, XP002110902 & JP 50 054684.

Chemical Abstracts, vol. 89, No. 14, Oct. 2, 1978 Columbus, Ohio, US; abstract No. 122628, XP002136587 abstract & SU 592 905.

P.S. Chang and J.F. Robyt, "Oxidation of Primary Alcohol Groups of Naturally Occurring Polysaccharides with 2,2,6,6–Tetramethyl–1–Piperidine Oxoammonium Ion", *J. Carbohydrate Chemistry*, vol. 15, No. 7, 1996, pp. 819–830.

* cited by examiner

*Primary Examiner*—James O. Wilson
*Assistant Examiner*—Ganapathy Krishnan
(74) *Attorney, Agent, or Firm*—Burns, Doane, Swecker & Mathis, LLP

(57) ABSTRACT

A process for oxidizing cellulose, in which a nitroxyl compound such as TEMPO is oxidized using an oxidizing agent in the presence of a complex of a transition metal such as Mn, Fe, Cu, and a complexing agent such as a polyamine, or an oxidative enzyme, and the resulting nitrosonium ion is used to selectively oxidize cellulose 6-hydroxy-methylene groups to carbaldehyde groups and carboxylic acid groups.

10 Claims, No Drawings

PROCESS FOR SELECTIVE OXIDATION OF CELLULOSE

The invention relates to the oxidation of cellulose and cellulose derivatives using nitrosonium ions (oxoammonium ions) obtained by oxidation of nitroxyl radicals, especially 2,2,6,6-tetramethylpiperidin-1-oxyl (TEMPO).

A process in which TEMPO is reoxidised by chemical means is known from a review by De Nooy in *Synthesis* 1996, 1153–1174 and from WO 95/07303.

The oxidation of cellulose to 6-aldehydo-cellulose by photolysis of 6-azido-6-deoxy-celluloses was reported by Horton et al. *Carbohydrate Research*, 26 (1973) 1–19.

It was found according to the invention that oxidation of cellulose, especially cellulose fibres, using nitrosonium ions, can be carried out without using chlorine-based oxidising agents and with the use of hydrogen peroxide or oxygen as the ultimate oxidising agent. The oxidation according to the invention is performed using enzymes capable of oxidation or transition complexes of a transition metal and a complexing agent as intermediate oxidants. This oxidation results in the formation of cellulose 6-aldehydes. The aldehydes may be present in the (hemi)acetal form and related structures. The process of the invention is further defined by the characterising features of the appending claims.

In the following description, reference is made to TEMPO only for the sake of simplicity, but it should be understood that other suitable nitroxyls, i.e. organic nitroxyl compounds lacking α-hydrogen atoms, such as 2,2,5,5-tetramethylpyrrolidine-N-oxyl (PROXYL), 4-hydroxy-TEMPO, 4-acetamido-TEMPO and derivatives thereof and those described in WO 95/07303 can be substituted for TEMPO. These di-tert-alkyl nitroxyls are especially suitable for selectively oxidising primary alcohols to aldehyde functions, in particular in the presence of secondary alcohol functions that should not be oxidised. Less sterically hindered nitroxyls, such as 4,4-dimethyloxazolidine-N-oxyl (DOXYL), are suitable for preferentially oxidising secondary alcohols to keto functions, for example in the production of keto cellulose or keto starch. The active oxidising species is the nitrosonium ion (oxoammonium ion>$N^+$=O), that is produced in situ by oxidation of the corresponding hydroxylamine and nitroxyl radical. If desired, the reaction can be performed in two steps, the production of the nitrosonium ion being the first and the oxidation of the alcohol function being the second.

A catalytic amount of nitroxyl is preferably 0.1–25% by weight, based on the primary alcohol functions of the cellulose, or 0.1–25 mol % with respect to the primary alcohol. The nitroxyl may also be immobilised, e.g. by coupling of the hydroxyl group of 4-hydroxy-TEMPO to a suitable carrier, or in the form of a polymeric nitroxyl such as: —[$(CH_3)_2$C—NO.—C$(CH_3)_2$—A—]$_n$—, wherein A may be an alkylene group and/or a heteroatom, and n is a number form e.g. 10 up to several hundreds.

The process of the invention results in oxidation of cellulosic anhydroglucose units to the corresponding aldehydes. If required the primary products can be further oxidised to the corresponding carboxylic acids by using known oxidising agents such as hypochlorite, chlorite, hydrogen peroxide or by using TEMPO-mediated oxidation under more vigorous conditions such as an increased temperature e.g. from 40–80° C., or for prolonged exposure to the reaction conditions. Alternatively, the aldehyde/carboxylic acid ratio can be increased by using relative low pH's (e.g. pH 3–7), by controlled addition of oxidising agent, by lowering the oxygen concentration, or by first preparing the nitrosonium ion solution (two-step process).

A distinct group of compounds suitable for oxidation with the present process consists of hydroxyalkylated cellulose such as hydroxypropyl cellulose, hydroxyethyl cellulose.

The oxidation of the primary alcohol functions (6-$CH_2OH$) results in the corresponding aldehydes and, if desired, to carboxylic acids, with intact ring systems. These products are useful intermediates for functional cellulose derivatives wherein the aldehyde groups are further reacted with e.g. amine compounds and the like. They are also useful intermediates for crosslinked cellulose derivatives, in which the aldehyde groups are further reacted with e.g. diamine reagents.

The catalysts to be used according to the invention are complexes of transition metals, i.e. coordination compounds between a transition metal and an organic molecule as a complexing agent having one or more free electron pairs, especially nitrogen compounds. Suitable nitrogen compounds include amino acids, phenanthrolines and other polyamines. A polyamine, which forms a complex with the transition metal, is understood to refer to compounds which comprise at least two amine nitrogen atoms, separated by at least two carbon atoms. Preferably, the polyamines comprise at least three nitrogen atoms which in each case are separated by two or more, in particular two or three, more in particular two, carbon atoms. The remaining valencies of the nitrogen atoms are preferably bound with small alkyl groups, in particular methyl. It is also possible for the polyamines to have ether or alcohol functions. The polyamines can be linear or cyclic. The polyamines should be alkaline, i.e. should not contain acid functions. Examples of polyamines which can be employed are 2,2'-bipyridyl, 2,2'-bipyrrole, 2-(dimethylaminomethyl)pyridine, tetramethylethylenediamine, pentamethyl-diethylenetriamine, 1,4-dimethylpiperazine, 1,4,7-trimethyl-1,4,7-triazonane (=triaza-cyclonanane), 1,4,7-trimethyl-1,4,7-triazecane, 1,4,7,10-tetramethyl-1,4,7,10-tetraaza-cyclododecane, 1,2-bis(4-methyl-1-piperazinyl)ethane, 1,2-bis(4,7-dimethyl-1,4,7-triazonan-1-yl)ethane, and the corresponding compounds wherein one or more of the said methyl groups have been replaced by, for example, ethyl groups. It is also possible to use porphin and other porphyrins and corresponding macrocyclic polyamine compounds. Histidine and comparable amino acids having an additional nitrogen atom, and their oligopeptides such as histidyl-histidine, are other examples of suitable complexing agents. Preference is given to compounds of the bipyridyl type, triazonane type and to amines whose remaining valencies are linked to methyl groups. The counterions required for neutrality of the complexes may be common, preferably non-toxic counterions such as oxide, halide, perchlorate, acetylacetonate, nitrate, sulphate and the like.

Transition metals to be used in the metal complexes include especially those of the fourth period of the periodic table of elements from vanadium to zinc, preferably manganese, iron, cobalt, nickel and copper, in particular manganese, iron, cobalt and copper. The corresponding metals from the higher periods may also be used, although less preferentially. The metal complexes require hydrogen peroxide, alkyl and ar(alk)yl hydroperoxides (such as tert-butyl hydroperoxide), oxygen or chlorite as an ultimate electron acceptor. About one metal atom to two to four nitrogen atoms of the compelling agent can suitably be used.

The metal complex may be used in a catalytic amount, e.g. in about an equimolar amount with respect to the nitroxyl compound. Suitable amounts of metal complexes are for example 1–25 mol % with respect to the alcohol to be oxidised.

The catalysts to be used according to the invention can also be oxidoreductases or other enzymes that are capable of oxidation in the presence of a suitable redox system. Oxidoreductases, i.e. enzymes capable of oxidation without the presence of further redox systems, to be used in the process of the invention include peroxidases and oxidases, in particular polyphenol oxidases and laccase.

Peroxidases (EC 1.11.1.1-1.11.1.11) that can be used according to the invention include the peroxidases which are cofactor-independent, in particular the classical peroxidases (EC 1.11.1.7). Peroxidases can be derived from any source, including plants, bacteria, filamentous and other fungi and yeasts. Examples are horse-radish peroxidase, soy-hull peroxidase, myeloperoxidase, lactoperoxidase, Arthromyces and Coprinus peroxidases. Several peroxidases are commercially available. The peroxidases require hydrogen peroxide as an electron acceptor.

Polyphenol oxidases (EC 1.10.3.1) include tyrosinases and catechol oxidases, such as lignine peroxidase. Suitable polyphenol oxidases may be obtained from fungi, plants or animals. The polyphenol oxidases require oxygen as an electron acceptor. Laccases (EC 1.10.3.2) are sometimes grouped under the polyphenol oxidases, but they can also be classified as a distinct group, sometimes referred to as p-diphenol oxidases. Laccases can be derived from plant sources or from microbial, especially fungal, sources, e.g. of the species *Trametes versicolor*. The laccases also require oxygen as an electron acceptor.

The process of the invention can be performed under relatively mild conditions, e.g. at a pH between 5 and 10, and at a temperature between 15 and 60° C. (both depending on the particular metal complex or enzyme). The reaction medium can be an aqueous medium, or a homogeneous mixed medium, e.g. of a mixture of water and a secondary or tertiary alcohol or an ether/water mixture, or a heterogeneous medium, e.g. a mixture of water and a water-immiscible organic solvent such as a hydrophobic ether, a hydrocarbon or a halogenated hydrocarbon. In the latter case, the metal complex or enzyme and/or the nitroxyl and the oxidising agent may be present in the aqueous phase and the alcohol substrate and the aldehyde or ketone product may be present in the organic phase. If necessary, a phase transfer catalyst may be used. The reaction medium can also be a solid/liquid mixture, in particular when the nitroxyl is immobilised on a solid carrier. A heterogeneous reaction medium may be advantageous when the substrate or the product is relatively sensitive or when separation of the product from the other reagents may present difficulties.

The invention also pertains to novel cellulose oxidation products and derivatives thereof, which can be obtained with the process of the invention. These include cellulose in which at least 1 hydroxymethyl per 100, especially per 50 or even per 25, monosaccharide units has been converted to a carbaldehyde group, whether or not in hemiacetal or similar form, with the proviso that on average each molecule contains at least 1 carbaldehyde group other than a possible (hemiacetalised) aldehyde group at the reducing end of an oligo- or polysaccharide, in addition to at least 1 hydroxymethyl group per 100 being oxidised to a carboxyl group. The products obtainable according to the invention may contain, in addition to the aldehyde groups, other functional groups, especially carboxyl groups obtained by further oxidation or by carboxyalkylation.

The novel derivatives of the invention are very suitable as wet strength additives, water-absorbing polymers and the like, and especially as starting materials for further functionalisation, especially with alcohols, amines, and other agents capable of coupling with an aldehyde function. Such agents include crosslinking agents (diamines, diols and the like), which can be used to crosslink the cellulose derivatives or to couple them to amino acids, proteins, active groups etc.

The invention also pertains to derivatives obtained by coupling of the aldehyde cellulose derivatives described above with e.g. amines, especially by reductive amination, to produce imino or amino derivatives of cellulose as defined in the appending claims. Also, the aldehyde cellulose derivatives can be reacted acetalised with hydroxy-functionalised compounds, e.g. glycolic acid, for further derivatisation.

The oxidation of cellulose and its derivatives according to the invention results in the presence of both aldehyde groups and carboxyl groups in the product. The process is especially useful for oxidising cellulose fibres, as the resulting oxidised fibres have improved wet strength properties for paper and tissue applications. The process is also useful for oxidising cellulose to produce a water-absorbing cellulosic material, if desired after further oxidation or carboxymethylation or other derivatisation of the product.

EXAMPLES

General

Uronic acid (6-COOH of hexopyranose units) contents were determined using the Blumenkrantz et al. method (*Anal. Biochem.* 54, (1973) 484). The method was adapted as follows. 5 ml of sample is suspended in water. 20 ml of a solution of boric acid (0.0125 M) in concentrated (95–97%) sulphuric acid is added. The final volume (V) is made up to 25 ml. 0.2 ml of this solution is added to 0.2 ml of pure water and then 1.0 ml of the sulphuric acid boric acid reagent is added. This solution is heated at 100° C. during 5 minutes. After cooling in ice 20 $\mu$l of an aqueous solution of 3-hydroxy-biphenyl (0.2% w/w) is added, upon which a pink colour develops. After 15 minutes incubation the extinction is measured at 520 nm. The calibration curve is based on D-glucuronic acid as a reference material.

Aldehyde contents were determined either by a subtractive method (determining the uronic acid content before and after of oxidation of aldehydes with chlorite and hydrogen peroxide), or by addition of hydroxylamine hydrochloride to produce an oxime and back-titration of liberated hydrochloric acid, or by $^{13}$C NMR spectroscopy (intensity of C6 signal of aldehyde with respect to C1 of anhydroglucose unit, or intensity of C6 (C=N) in the oxime).

Example 1

Production of 6-aldehyde Cellulose

One gram of totally chlorine-free bleached and sheet-dried kraft pulp (Grapho Celeste), dry weight oven dried) was suspended in 100 ml of water. To this suspension were added 18 mg of TEMPO (0.1 mmol) and 9 mg of peroxidase (HRPO), type VI (290 units/mg). The pH was adjusted to 5.1 with aqueous acetic acid (0.1 M). A hydrogen peroxide solution (1.5 ml 30% in 50 ml) was added stepwise (30–50 $\mu$l every 2 minutes) for 8 hours. After peroxide addition the pH decreased, but it returned to its original value (5.5) after a few minutes; therefore, no pH adjustment was necessary during the reaction. After 21 h a sample was analysed by addition of hydroxyl-ammonium chloride and titrated with aqueous sodium hdyroxide (0.1 M). According to this analysis, the sample contained 160 micromol C6-aldehyde per g cellulose.

Example 2

Oxidation of Cellulose with Laccase

To 2 g of cellulose fibres, activated by treatment with sodium hydroxide solution and water, 17 mg recombinant *Trametes versicolor* laccase (Wacker Chemie) was added. The solution (pH between 6.0 and 5.1) was exposed to oxygen in a closed system so that the consumption of oxygen could be measured by a gas burette as a function of time. The consumption of oxygen after one day reaction was 20 ml (0.8 mmol). As a second step 0.2 ml hydrogen peroxide (30% w/w) and 250 mg sodium chlorite (Aldrich, 80%) were added to the reaction mixture. After standing for one day at pH 4–4.5, an almost homogeneous mixture was obtained, from which samples were withdrawn. The uronic acid content of the whole reaction mixture was determined. According to the adapted Blumenkrantz method the content was 0.7 mmol, which gives 350 mmol/g.

Example 3

Oxidation of Cellulose Fibres

To 2 gram cellulose fibers (the same as in Example 1) suspended in 25 ml water, 28 mg of horse radish peroxidase (HRP, Sigma), 20 mg TEMPO were added. The pH of the mixture was brought to 5.3 and then 1 mmol of hydrogen peroxide solution (5 ml 0.6%, w/w) was added in 100 μl portions in the course of 3 hours. Despite the relatively quick addition, gas (oxygen) evolution was hardly visible. According to the Blumenkrantz method the yield of uronic acid was 9%. This example illustrates the influence of rate of hydrogen peroxide addition which was fast compared to example 1, resulting in relatively high levels of carboxylic acid

Example 4

Oxidation of Cellulose Fibres with Oxygen Catalysed by Copper/bipyridine.

1 gram cellulose fibres (CTMP) were suspended in 50 ml water. Then 10 ml of a 5% (w/w) TEMPO solution, 0.4 ml of a solution of copper nitrate (0.4M) and 10 ml of a bipyridine solution (0.05M) were added. Through the stirred solution oxygen gas was bubbled. After one day the fibres were collected by filtration, washed repeatedly with water and dried in vacuum. The uronic acid content (adapted Blumenkrantz) of the dried fibres was 9%.

Example 5

Production of 6-aldehyde-6-carboxy Cellulose

Production of 6-aldehyde-6-carboxy cellulose. One gram of totally chlorine-free bleached and sheet-dried kraft pulp (Grapho Celeste), dry weight oven-dried) was suspended in 20 ml of water. To this suspension were added 20 mg of TEMPO (0.1 mmol) and 19 mg of peroxidase (HRPO), type VI (290 units/mg). The pH was adjusted to 5.5 with aqueous acetic acid (0.1 M). A hydrogen peroxide solution (1.2 ml 3%) was added stepwise (50 ml every 10 minutes) for 6 hours. After 21 h a sample was analysed by addition of hydroxylammonium chloride and titrated with aqueous sodium hydroxide (0.05 M). According to this analysis, the sample contained 300 micromol C6-aldehyde per g cellulose. In addition it was found that the sample contains uronic acid (100 micromol per g).

What is claimed is:

1. A process for oxidising cellulose comprising:

obtaining nitrosonium ions by oxidising a nitroxyl compound with an oxidising agent in the presence of a complex of a transition metal and a complexing agent, and oxidizing the cellulose with the nitrosonium ions.

2. A process according to claim 1, wherein the nitroxyl compound is a di-tert-alkyl-nitroxyl compound.

3. A process according to claim 1, wherein the transition metal is manganese, iron, cobalt, nickel, copper or vanadium.

4. A process according to claim 1, wherein the complexing agent is a nitrogen-containing compound.

5. A process according to claim 4, wherein the complexing agent is a bipyridyl or a triazonane or a (poly)histidine.

6. A process for oxidising cellulose comprising:

obtaining nitrosonium ions by oxidising a nitroxyl compound with an oxidising agent in the presence of an oxidative enzyme or a complex of a transition metal and a complexing agent, and oxidizing the cellulose with the nitrosonium ions, wherein a cellulose derivative containing at least 1 cyclic monosaccharide group carrying a carbaldehyde group per 25 monosaccharide units and per cellulose molecule is produced.

7. An oxidised cellulose, containing at least 1 cyclic monosaccharide group carrying a 6-carbaldehyde group and at least 1 cyclic monosaccharide group carrying a 6-carboxylic group per 100 monosaccharide units and per cellulose molecule, and further containing carboxyl groups obtained by further oxidation or carboxyalkylation of hydroxyl groups of the cellulose.

8. A cellulose derivative, in which derivative at least a part of the 6-carbaldehyde groups introduced by oxidation has been converted to a group with the formula —CH=N—R or —CH$_2$—NHR, wherein R is hydrogen, hydroxyl, amino, or a group $R^1$, $OR^1$ or $NHR^1$, in which $R^1$ is $C_1$–$C_{20}$ alkyl, $C_1$–$C_{20}$ acyl, a carbohydrate residue, or $C_1$–$C_{20}$ alkyl substituted by amino or hydroxyl.

9. A cellulose derivative, in which derivative at least a part of the 6-carbaldehyde groups introduced by oxidation has been converted to a group with the formula —CH($OR^3$)—O—CH$_2$—COOR$^2$ or —CH(—O—CH$_2$—COOR$^2$)$_2$, in which $R^2$ is hydrogen, a metal cation or an optionally substituted ammonium group, and $R^3$ is hydrogen or a direct bond replacing a hydroxyl group of the cellulose.

10. A process according to claim 1, wherein the nitroxyl compound is 2,2,6,6-tetra-methylpiperidin-1-oxyl (TEMPO).

* * * * *